US008329043B2

(12) United States Patent
Poeschl

(10) Patent No.: US 8,329,043 B2
(45) Date of Patent: Dec. 11, 2012

(54) METHOD AND DEVICE FOR TREATING A LIQUID

(75) Inventor: Guenter Poeschl, Donauwoerth (DE)

(73) Assignee: Ultrasonic Systems GmbH, Thierhaupten (DE)

(*) Notice: Subject to any disclaimer, the term of this patent is extended or adjusted under 35 U.S.C. 154(b) by 661 days.

(21) Appl. No.: 12/521,528

(22) PCT Filed: Dec. 28, 2007

(86) PCT No.: PCT/EP2007/011456
§ 371 (c)(1),
(2), (4) Date: Jun. 26, 2009

(87) PCT Pub. No.: WO2008/080618
PCT Pub. Date: Jul. 10, 2008

(65) Prior Publication Data

US 2010/0314331 A1 Dec. 16, 2010

(30) Foreign Application Priority Data

Dec. 28, 2006 (DE) ......................... 10 2006 061 906
Mar. 21, 2007 (DE) ......................... 10 2007 013 533

(51) Int. Cl.
*C02F 1/36* (2006.01)
*C02F 1/72* (2006.01)

(52) U.S. Cl. ......... 210/748.03; 210/748.02; 210/748.01; 210/748.16; 210/150; 210/220; 422/20; 422/127; 422/128; 422/231; 366/127; 366/101; 366/102; 366/108; 366/116; 366/117; 366/279; 366/316; 366/317

(58) Field of Classification Search ............. 210/748.02, 210/748.03, 150, 748.16, 748.19, 758, 220, 210/748.01; 422/20, 186.3, 22, 24, 127, 422/128, 231; 366/101, 102, 108, 116, 117, 366/118, 127, 279, 316, 317
See application file for complete search history.

(56) References Cited

U.S. PATENT DOCUMENTS

| | | | | |
|---|---|---|---|---|
| 4,003,832 | A * | 1/1977 | Henderson et al. | 210/728 |
| 4,298,467 | A * | 11/1981 | Gartner et al. | 210/96.1 |
| 4,371,480 | A | 2/1983 | Vos | |
| 4,952,417 | A | 8/1990 | Escola Gallart | |
| 5,925,290 | A | 7/1999 | Hills | |
| 6,029,911 | A | 2/2000 | Watanabe et al. | |
| 6,491,829 | B2 | 12/2002 | Suzuki et al. | |
| 2004/0062647 | A1* | 4/2004 | Garrett, III | 415/206 |
| 2005/0006313 | A1* | 1/2005 | Swinnen et al. | 210/748 |

FOREIGN PATENT DOCUMENTS

| | | | |
|---|---|---|---|
| CH | 283308 | | 5/1952 |
| DE | 2455633 | A1 | 7/1975 |
| DE | 29 41 440 | A1 | 4/1981 |
| DE | 69805078 | T2 | 10/2002 |

(Continued)

*Primary Examiner* — Joseph Drodge
*Assistant Examiner* — Cameron J Allen
(74) *Attorney, Agent, or Firm* — McNees Wallace & Nurick LLC

(57) ABSTRACT

In a method of treating a liquid, a liquid to be treated is introduced into a space, a mechanical cavitation element acts upon the liquid while gas is supplied into the region of the surface of the cavitation element and introduces the gas into the liquid by moving the cavitation element, and sound waves are introduced directly into the liquid by at least one acoustic power transducer.

24 Claims, 4 Drawing Sheets

FOREIGN PATENT DOCUMENTS

| | | | | |
|---|---|---|---|---|
| DE | 10258898 | A1 | | 7/2004 |
| DE | 202004020459 | U1 | | 7/2005 |
| DE | 102004002545 | A1 | | 8/2005 |
| DE | 60015482 | T2 | | 10/2005 |
| EP | 0680779 | | | 11/1995 |
| FR | 2679790 | | | 2/1993 |
| JP | 5717414 | | | 10/1982 |
| JP | 04161296 | A | | 6/1992 |
| JP | 05-220371 | | | 8/1993 |
| JP | 08-113300 | | | 5/1996 |
| JP | 10-226503 | | | 8/1998 |
| JP | 2002-085949 | | | 3/2002 |
| JP | 2004000897 | A | | 1/2004 |
| JP | 2006176874 | A | | 7/2006 |
| JP | 2006-289183 | | | 10/2006 |
| SU | 1240439 | | | 6/1986 |
| SU | 1240439 | A | * | 6/1986 |
| WO | 2005/014489 | A1 | | 2/2005 |

* cited by examiner

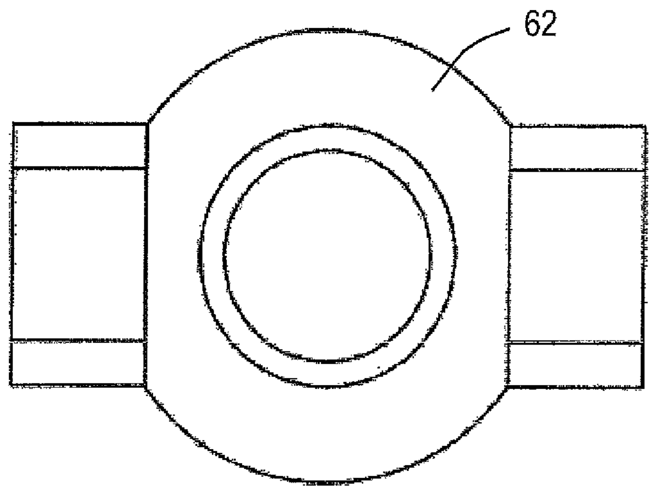
Fig. 5
Fig. 6
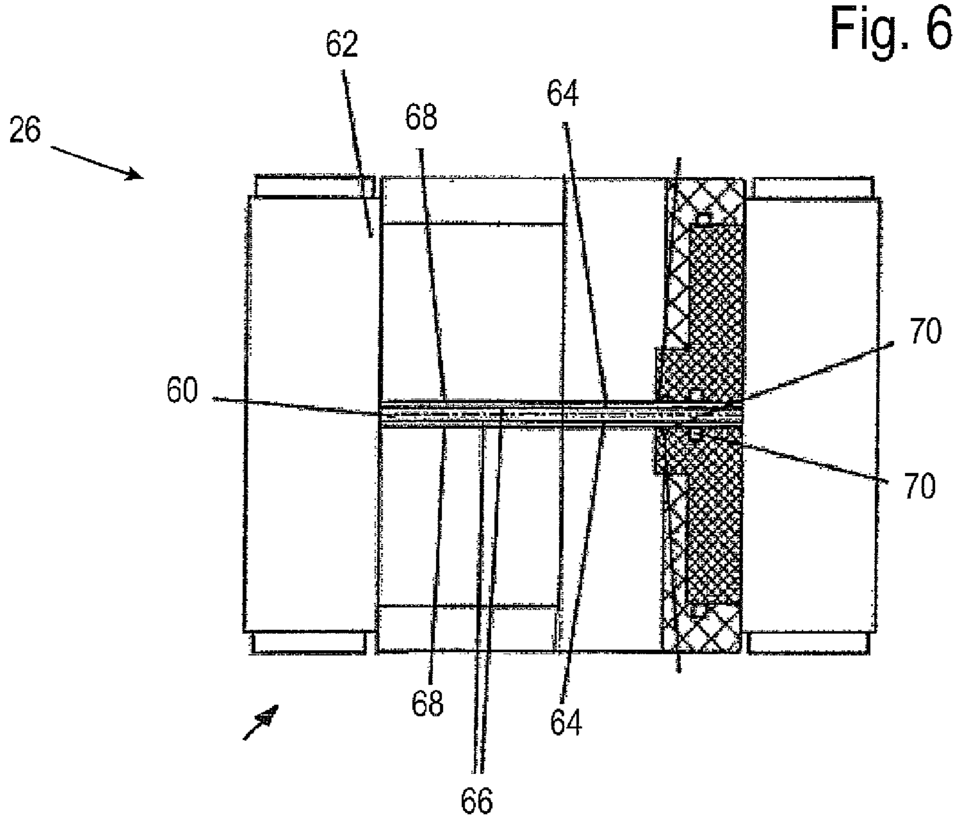

Fig. 7
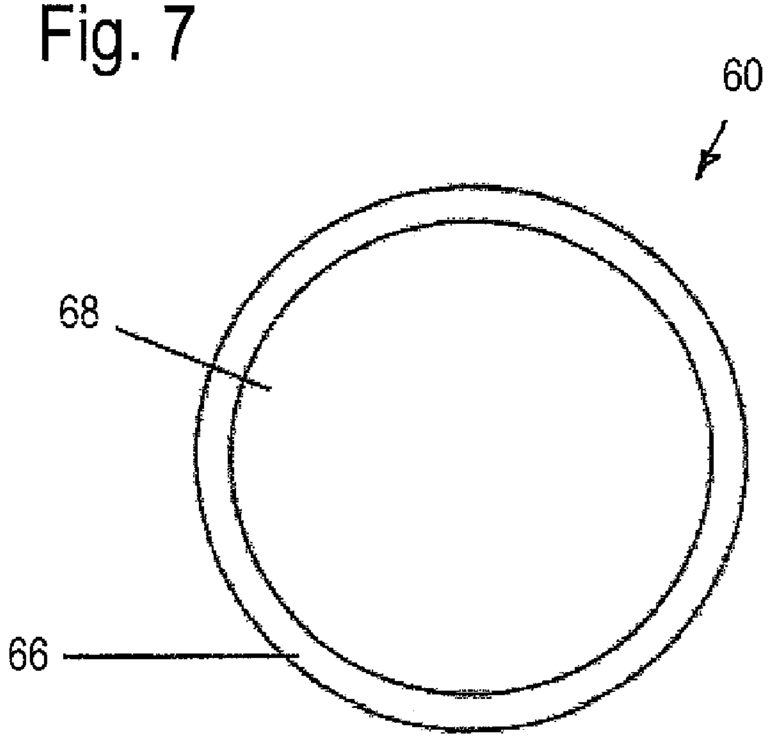
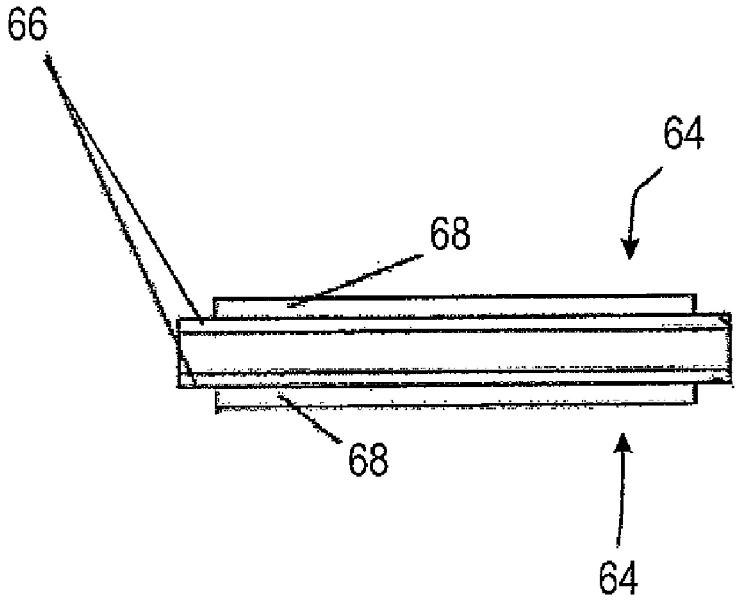
Fig. 8

METHOD AND DEVICE FOR TREATING A LIQUID

BACKGROUND OF THE INVENTION

The present invention relates to a method of treating a liquid. In particular, the present invention relates to a method of introducing gas into a liquid.

Charging a liquid with gas is of advantage for a multitude of purposes. For example, it allows chemical reactions to occur between the gas and the liquid or between the gas and substances contained in the liquid. One possible purpose of use is the treatment of water, both of drinking water and of sewage, where the introduction of appropriately reactive gases may reduce the germ load.

A technical problem resides in increasing the proportion of the quantity of gas effectively introduced into the liquid. The higher this proportion, the greater the extent to which a chemical reaction between the gas and the liquid may take place. Therefore, it has long been discussed to support the distribution of the introduced gas in the liquid by ultrasound.

SUMMARY OF THE INVENTION

It is the object of the invention to provide an effective method of introducing gases into a liquid.

To this end, a method of treating a liquid includes the following steps:

- introducing the liquid to be treated into a space;
- allowing a mechanical cavitation element to act upon the liquid while supplying gas into the region of the surface of the cavitation element and introducing the gas into the liquid by moving the cavitation element; and
- introducing sound waves directly into the liquid by at least one acoustic power transducer.

The introduction of gas into the liquid is effected in two stages, as it were. By means of the cavitation element, first a mixing of the gas with the liquid is attained in which the mean bubble size is still relatively high. Since the gas is introduced directly at the surface of the cavitation element, in particular by means of a gas supply pipe, it is ensured that by the cavitation process practically the entire amount of the gas reaches the liquid. As a "second stage", the sound waves introduced into the liquid by the acoustic power transducer cause a reduction in size of the gas bubbles, so that the mean bubble size is distinctly reduced throughout the liquid. It should be noted here, however, that the movement of the cavitation element and the exposure of the space to sound waves, and thus also the processes of introducing the gas and reducing the bubble size take place at the same time. In this way, a sonochemical dissolution of the gas in the liquid is obtained, with a high and more particularly predominant proportion of the gas being present in a molecularly dispersively dissolved form. The gas may be present as a pure substance or a mixture of substances.

Using this method, a mean bubble size of, e.g., less than 50 μm may be attained, and a high proportion of bubbles may be produced in the nanometer to angstrom range.

Compared with conventional known methods, the method according to the invention allows a distinctly higher proportion of gas to be introduced into the liquid.

Upon introduction of the liquid, the space is preferably completely filled with liquid, so that the sound waves propagate throughout the space and may be reflected into the liquid from all directions. The quantity of the introduced gas is advantageously selected such and the introduction of the gas is advantageously effected such that no gas volume is produced above the liquid.

The acoustic power transducer is preferably a piezoelectric element, which may be of a disk-shaped design, for example.

It is possible to arrange just one, two, or a multitude of acoustic power transducers in the space. Each of the acoustic power transducers is in direct contact with the liquid, so that the sound waves are emitted directly into the liquid. Direct contact in this connection means that the vibrations from the power transducer are not introduced into the liquid by any conducting solid parts, as in the case of, e.g., a sonotrode. Rather, the liquid is directly applied to the power transducer, i.e. the source of ultrasound itself.

Preferably, the acoustic power transducer gives off sound waves of different frequencies. Where a plurality of power transducers is provided, they each generate sound waves in the same frequency range or in different frequency ranges. It has been found that it is of advantage to have such a "mixture of frequencies" to act upon the liquid to dissolve a large amount of gas.

The frequency of the sound waves is preferably in the ultrasonic range, in particular between 400 and 1500 kHz. Frequencies between 600 and 1200 kHz are employed with particular preference.

In an advantageous embodiment of the present invention, the acoustic power transducer is operated in a pulsed fashion, with the pulse duration being selected such that the gas bubbles are split up and the gas is dissolved in the liquid as effectively as possible. When a plurality of acoustic power transducers is provided, all or only some of them may be operated in pulsed operation, with identical or different pulse durations and pulse frequencies.

It is possible to arrange reflectors for sound waves in the space, which reflect the sound waves back into the liquid.

Advantageously, the motion of the mechanical cavitation element is a rotary motion since this allows a good cavitation effect to be achieved in a simple way. For the mechanical cavitation element, use is preferably made of a flow body which is shaped in such a manner that it produces zones of a maximum possible flow velocity along its surface, in order to obtain the highest possible cavitation effect and, hence, a good mixing of the gas with the liquid.

The mechanical cavitation element is of a disk-shaped or discus-shaped design, for example. Here, a disk may be used which is provided with special structures such as, e.g., ellipsoid-shaped pockets, in the region of which very high flow velocities develop.

The supplying of gas is preferably effected in the region of the highest flow velocity at the surface of the cavitation element, since it has been found that this allows a particularly thorough mixing to be achieved. This may be effected in the region of the above-mentioned structures or else in the region of the edge of the disk.

In an advantageous embodiment, the liquid flows through the space. That is, the method is applied to a liquid flowing through the respective device on the throughflow principle, rather than to a standing liquid volume.

The term "space" should be understood in a broad sense here. It essentially describes the continuous volume around the cavitation element as far as to the volume around the acoustic power transducers. These volumes may be situated immediately adjacent to or at a certain distance from each other, which is of course co-determined by the outgassing of the gas introduced into the liquid by the cavitation element. The space may be formed by one single largish chamber, in which both the cavitation element and the acoustic power transducer(s) are arranged, or else by a plurality of chambers, which are however coupled to each other by conduits so as to be connected, with the cavitation element and the acoustic power transducer each being arranged in a separate chamber. What is important, however, is that the effect of the ultrasound reaches as far as to the cavitation element. But it is always of advantage if the entire space, which comprises the cavitation element and the acoustic power transducer(s), is traversed as uniformly as possible by the sound waves of the acoustic power transducer(s).

Preferably, the cavitation element is arranged upstream of the acoustic power transducer, so that the relatively large bubbles introduced into the liquid by the cavitation element are subsequently caught by the sound waves of the acoustic power transducer(s) and are "crushed" thereby and the gas is dissolved.

It is possible to degas the liquid prior to the treatment with the cavitation element and the sound waves. This has the advantage that the solubility of the gas to be introduced is increased by other gases being removed from the liquid beforehand.

For degassing, at least one acoustic power transducer may be arranged upstream of the cavitation element, for example. This acoustic power transducer is advantageously provided in addition to the power transducer arranged downstream of the cavitation element. It has been found that a degassing by means of acoustic power transducers is very effective. In this way, the liquid arriving at the cavitation element is largely gas-free and can therefore be loaded with gas again to a higher extent.

It has further turned out that the time interval for the liquid between passing the cavitation element and passing the acoustic power transducer may amount to up to 10 seconds without a loss occurring in the effectiveness of the gas loading.

The gas may be fed into the system in a liquid form, which facilitates the supply and storage. Where liquid oxygen is used, for example, an advantageous cooling effect on the cavitation element and the surrounding liquid is additionally produced, which increases the solubility of the gas in the liquid since the temperature of the liquid may be purposefully lowered.

The method according to the invention is very well suited for use in the treatment of water, in particular of drinking water or wastewater.

To this end, provision is made in particular that the gas contains at least one gas having oxidative properties, such as ozone.

To generate the ozone, it is possible to treat the gas with UV light prior to supplying it to the cavitation element. When the gas used is oxygen or air, the UV irradiation causes oxygen to be converted into ozone. This has the advantage that the highly reactive ozone is not generated until immediately before its contact with the liquid. For example, the UV treatment may be effected immediately prior to the exit of the gas at the cavitation element or also at a different place in the gas supply system. A UV lamp may be used for this purpose. An irradiation with X-rays or gamma radiation is also conceivable.

The method according to the invention may be employed, for example, for degerminating the liquid or generally for destroying bacteria, viruses, fungal spores, toxins, or endocrine disrupting substances, or for denaturing proteins. In addition, it may be generally used for the gassing of liquids, not only of water or wastewater, with any suitable gas.

The present invention furthermore relates to a device, in particular for carrying out any of the methods described, comprising a space, a mechanical cavitation element arranged in the space, a gas supply means having an outlet which opens in the immediate vicinity of the surface of the cavitation element, and an acoustic power transducer disposed in the space and arranged to emit sound waves directly into the space. For treating the liquid, the space is filled with the liquid, preferably completely, so that the movement of the mechanical cavitation element causes cavitation in the liquid and the acoustic power transducer(s) is/are in direct contact with the liquid to couple sound waves directly into the liquid.

To increase the cavitation effect, the space preferably has a non-rotationally symmetrical cross-section in the region of the cavitation element. The cross-section may be polygonal, for example.

BRIEF DESCRIPTION OF THE DRAWINGS

Further features and advantage of the invention will be apparent from the following description of an exemplary embodiment given with reference to the accompanying drawings, in which:

FIGS. 5 and 6 show views of an acoustic power transducer for use in the device according to the invention and in the method according to the invention; and FIGS. 7 and 8 show a piezoelectric element for use in an acoustic power transducer according to FIGS. 5 and 6.

DETAILED DESCRIPTION OF THE INVENTION

Figure 1:
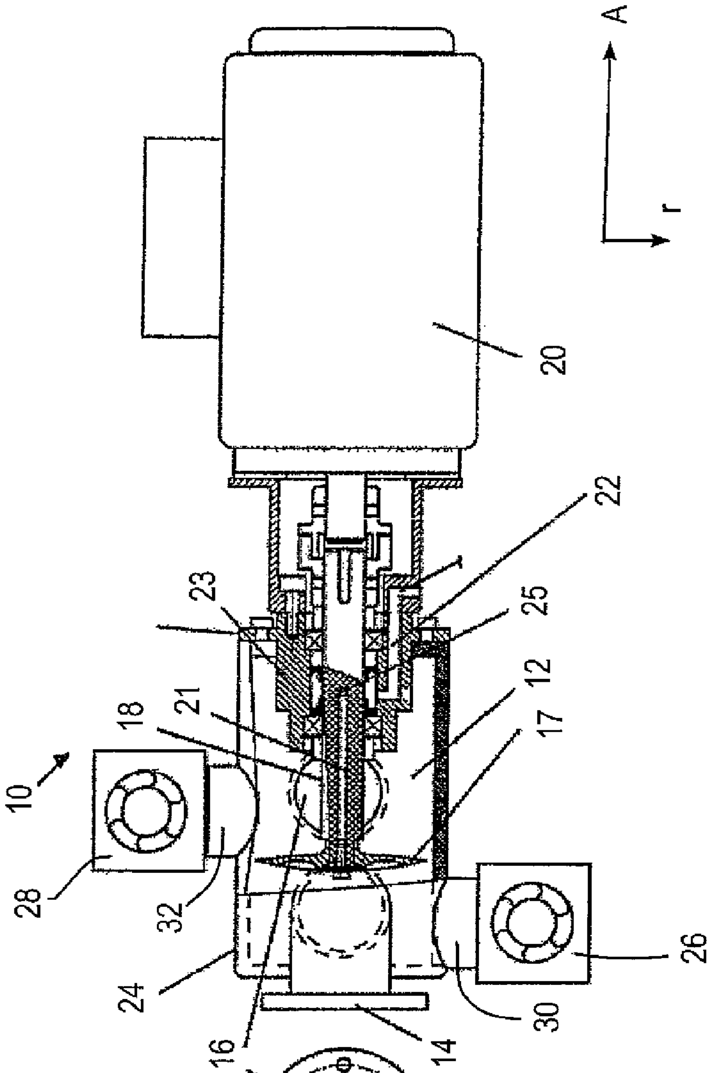
FIG. 1 shows a partially sectional view of a device according to the invention for carrying out a method according to the invention.
Figure 2:
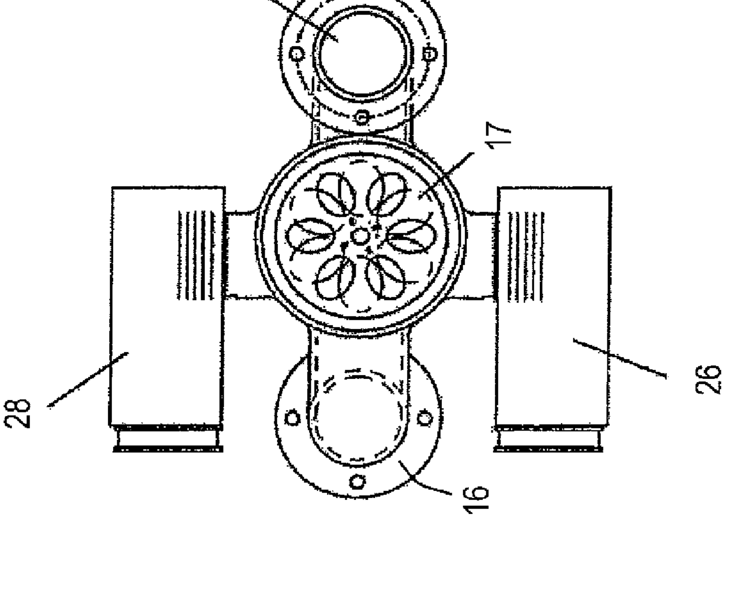
FIG. 2 shows a partially sectioned top view of the device in FIG. 1.

FIG. 1 shows a device for carrying out a method of treating liquids by loading the liquid with gas.

A space 12 for receiving the liquid has an inlet 14 and an outlet 16. In this example, the space 12 is in the form of one single chamber.

The method is operated on the throughflow principle, i.e. the liquid flows through the inlet 14 into the space 12 and through the outlet 16 out of the space 12 at a uniform velocity of flow. The inlet 14 and the outlet 16 are arranged on opposite sides of the space 12 and offset in relation to each other in the axial direction A. In operation, the device 10 is oriented such that the inlet 14 is located at the lower end of the space 12.

In operation of the device 10, the entire space 12 is completely filled with liquid.

Near the inlet 14 a mechanical cavitation element 17 is located, here in the form of a horizontally and rotatably mounted discus-shaped disk which is shaped as a flow body and has opposite convex sides that meet at a sharp peripheral edge. The cavitation element 17 is connected by means of a hollow shaft 18 to a continuously controllable motor 20, which determines the rotational speed of the cavitation element 17. The cavitation element 17 is fully immersed in the liquid and is moved so fast that cavitation occurs in the liquid.

Inside the hollow shaft 18 a gas supply pipe 21 is formed (see FIGS. 1 and 3), which is part of a gas supply means through which gas is guided to the surface of the cavitation element 17 for introduction into the liquid. To this end, the gas supply pipe 21 is connected with a duct 22 which opens outside the space 12 and may be connected to a gas supply (not shown).

The gas may be supplied in liquid form; depending on the temperature of the liquid gas, it is of advantage if the gas is already gaseous when it enters the duct 22. Using cooled liquid gas such as, e.g., liquid oxygen offers the advantage that the gas supply means at the same time contributes to the cooling of the overall device 10 and, hence, also to the cooling of the liquid in the space 12.

Figure 3:
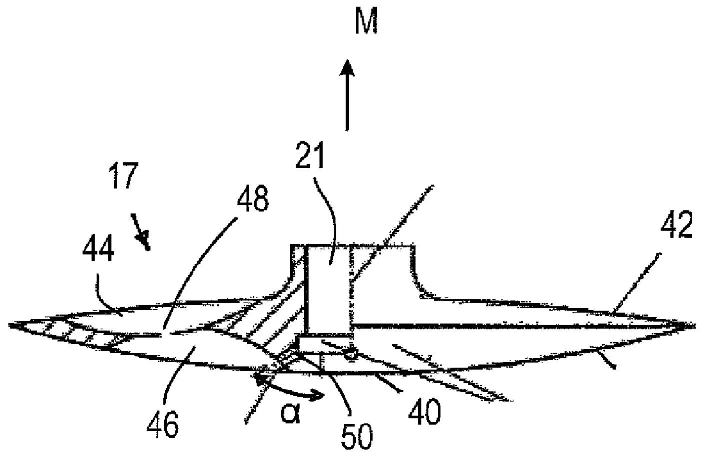
FIGS. 3 and 4 show views of a mechanical cavitation element for use in the device according to the invention and for carrying out the method according to the invention.
Figure 4:
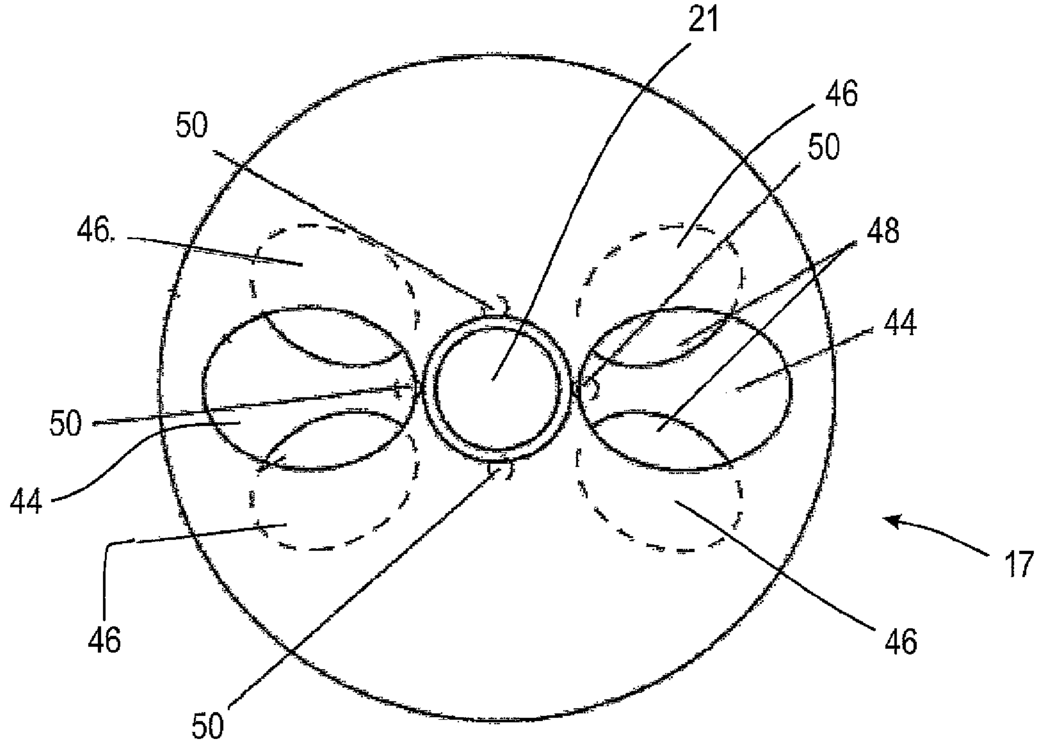

FIGS. 3 and 4 show one possible configuration of a cavitation element 17. The cavitation element 17 has the shape of a disk formed as a flow body, the front face 40 having a greater convex curvature than the rear face 42. Provided in the front face 40 of the cavitation element 17 are two ellipsoidal pockets 44. Formed in the rear face 42 is a plurality of pockets 46 which are peripherally slightly offset in relation to each other, the depth of the pockets 44, 46 being selected such that openings are formed between the front face 40 and the rear face 42 of the cavitation element 17 in the area of the pockets 44. In FIG. 4, two of these openings are denoted with reference numeral 48. Owing to this design, very high velocities of flow develop not only in the area of the peripheral edge of the cavitation element 17, but also in the area of the pockets 44, 46, as a result of which a very high cavitation effect is produced especially at these locations.

The gas supply pipe 21 opens directly at the surface of the cavitation element 17, as can be seen in FIGS. 3 and 4.

The gas to be supplied flows in through the duct 22, which is connected with the hollow shaft 18 by means of a transverse hole 25. That part of the gas supply means which is arranged between the motor 20 and the cavitation element 17 is in this case arranged within a housing 23 which surrounds the hollow shaft 18 and connects the cavitation element 17 with the motor 20. The gas supply pipe 21 terminates inside the cavitation element 17 in an outlet which is made in the form of a plurality of opening channels 50 which are oriented obliquely to the center axis M and which each extend as far as to the surface of the cavitation element 17 and, in the specific example, reach the surface on the inside of the pockets 46. The gas conveyed through the gas supply means thus emerges directly at the surface of the cavitation element 17 and is introduced into the liquid in the area of the greatest cavitation effect. The exit angle α of the opening channels 50 (as measured in relation to the vertical line) amounts to roughly 50 degrees here, but may, of course, be adapted to the respective purpose of application.

The gas feeding in the immediate vicinity of the surface of the cavitation element may also be effected at a different place, not only through the cavitation element.

The cross-section of the space 12 (see FIG. 1) in the region of the cavitation element 17 is selected to differ from a circular shape and is not rotationally symmetrical. It is, for example, polygon-shaped, such as triangular, tetragonal or pentagonal. This serves to increase the cavitation effect by preventing the formation of a rotating flow around the cavitation element 17.

The space 12 is enclosed by a wall 24 which keeps the liquid inside the space 12. Aside from the chamber in which the cavitation element 17 is arranged, the space 12 also includes the connecting conduits.

The space 12 here also comprises a pair of short connecting pieces 30, 32 which are bent by 90 degrees and each of which has an acoustic power transducer 26, 28 connected thereto. The connecting pieces 30, 32 connect the acoustic power transducers 26, 28 to the chamber which contains the cavitation element 17. Both acoustic power transducers 26, 28 are in the form of ultrasonic transducers here and operate in a frequency range of from 400 to 1500 kHz, preferably in a frequency range of from 600 to 1200 kHz. The connecting piece 30 here opens at the level of the inlet 14, offset by 90 degrees in relation thereto in the peripheral direction of the chamber, whereas the connecting piece 32 opens at the level of the outlet 16, likewise offset by 90 degrees in relation thereto. The two acoustic power transducers 26, 28 are axially spaced apart from each other, so that sound waves of one power transducer can not be directly coupled into the other power transducer. The acoustic power transducers couple ultrasonic energy as an elementary wave directly into the liquid and also into the cavitation element 17, more specifically on both sides of each disk-shaped power transducer 26, 28.

Each of the acoustic power transducers 26, 28 emits a spectrum of different frequencies at the same time.

At least the acoustic power transducer 28 and optionally the acoustic power transducer 26 as well are operated in a pulsed fashion, rather than in a continuous operation, with the pulse frequency and pulse duration being adjusted to the respective geometry of the space 12, the gas used and the liquid used.

FIGS. 5 to 8 show one possible configuration of an acoustic power transducer as may be employed for the acoustic power transducers 26, 28.

A disk-shaped actuator 60, which consists of a piezoelectric material here, is arranged in a housing 62, which is preferably made of an electrically non-conductive ceramic or plastic material. Both front faces 64 are coated with an electrically conductive contact layer, in this case a silver layer 66. Except for a circular area near the edge, both front faces 64 are furthermore coated with a chemically inert protective layer 68, in particular gas, which covers the entire area of the actuator 60 that comes into contact with the liquid. The electrically conductive layer 66 serves for contacting and for excitation of the piezoelectric material and is connected to an adjustable voltage generator in a known manner.

The actuator 60 is inserted in the housing 62 in such a way that the transition between the protective layer 68 and the electrically conductive layer 66 is sealed by elastic gaskets 70.

The liquid can flow into the housing 62 so that it is in direct contact with the actuator 60. As a result, the acoustic power transducer can couple the sound waves directly into the liquid.

For loading the liquid with gas, the cavitation element 17 is caused to rotate so fast that cavitation occurs in the liquid. Gas is guided through the gas supply means to the surface of the cavitation element 17. The cavitation effect causes practically the entire amount of the gas introduced to be fed into the liquid. The quantity of gas introduced may, for example, amount to 285 g/h for oxygen in well water having a temperature of 15° C. The mean bubble size is still relatively large here. Since the entire space is filled with the sound waves of the acoustic power transducers 26, 28, the bubbles generated by the cavitation element 17 are instantly further worked on by the sound energy and split up in the process, with a mean bubble size resulting in the nanometer range and a large proportion of bubbles being generated in the angstrom range. This results in that a large proportion of the gas introduced is dissolved molecularly dispersely, as it were, in the liquid. Therefore, the entire gas introduced remains in the liquid over a relatively long period of time. This sonochemical treatment causes a higher proportion of the gas to be dissolved in the liquid than by using conventional methods. The two-stage process according to the invention is based on the introduction of the gas through the cavitation element 17 and the subsequent treatment of the gas bubbles already present in the liquid by sound waves emitted by the acoustic power transducers 26, 28.

Since the method proceeds on the throughflow principle, it would also be possible to arrange the cavitation element 17 and one or both of the acoustic power transducers 26, 28 in different chambers that are only connected to each other by conduits. It has been found here that the distance can be selected to be so great that up to 10 s may pass between passing the cavitation element 17 and the acoustic power transducer 26, 28, in which time the liquid flows from one chamber to the other chamber. Attention should be paid here to select the geometry of the space 12 such that the entire space is constantly acoustically irradiated by the sound waves of the acoustic power transducers 26, 28. Suitable reflectors may be arranged in the space 12.

The geometry of the space 12 and the arrangement of the acoustic power transducers 26, 28 is selected such that as few standing waves as possible develop in the space 12.

In the arrangement shown, the first acoustic power transducer 26, as seen in terms of flow, may also be made use of for degassing the liquid before the latter is loaded with gas again. The liquid flowing in is directly exposed to the sound waves of the acoustic power transducer 26, which results in any gas already dissolved in the liquid being expelled from the liquid. It is only then that the liquid reaches the region of the cavitation element 17, where it is loaded again with the specially supplied gas.

When wastewater from sewage treatment plants is discharged into surface waters, it has been sufficiently purified according to the state of the art, but it nevertheless contains a multitude of nutrients, bacteria and germs which are detrimental to health and make swimming in rivers or lakes a health hazard. For this reason, EU regulations prescribe a germ reduction even when discharging into the sea at bathing beaches.

One purpose of application of the device 10 and of the method carried out therewith is the purification of water, in particular of wastewater. The device 10 may be employed, for example, for treating the wastewater in sewage treatment plants.

For this application the gas supplied is preferably ozoniferous, with pure oxygen or also air being able to be used as starting gas.

To generate the ozone, provision is made for an irradiation with UV light in the region of the gas supply means. This irradiation may be effected by a UV lamp which is arranged in the region of the duct 22 or even the hollow shaft 18, for example. Instead of using the UV lamp, an irradiation with X-rays or gamma rays may also take place. At all events, supplying high-energy radiation results in that part of the oxygen is converted into ozone. Since the ozone is generated in the immediate vicinity of the exit of the gas, the problem of the ozone disintegrating again between its generation and its introduction into the liquid does not exist. It is, however, also possible to generate the ozone by means of a conventional ozone generator and then to supply it into the wastewater.

The gas may be fed into the system in liquid form, such as, e.g., in the form of liquid oxygen; when it enters the duct 22, it is preferably already in the gaseous form.

The ozone, preferably molecularly dispersely dissolved in the liquid, together with the treatment by the ultrasonic waves, results in a reliable degermination of the liquid. In addition to bacteria, viruses, fungal spores as well as proteins, toxins or, of special interest, endocrine disrupting substances are also reliably destroyed. In the case of the proteins, the destruction is mainly effected in a known way by a denaturation, that is, a reaction of the ozone with specific chemical groups of the protein molecule.

The method according to the invention allows the gas to remain dissolved for a longer time than with conventional methods because a very small bubble size is attained. Bubbles having a diameter of some angstroms or a few nanometers no longer behave like larger gas bubbles, which directly rise up to the surface, but in some cases even show a behavior of being heavier than water and sink to the bottom. In addition, they are considerably more long-lived in the liquid than larger gas bubbles. In contrast to the larger gas bubbles, in the case of the bubbles in the angstrom to nanometer ranges the internal pressure inside the bubbles is approximately equal to the ambient pressure in the liquid. Furthermore, they have a distinctly lower tendency to join together to form larger bubbles, so that the component of smallest bubbles remains contained in the liquid for a very long time.

For one thing, this offers the ozone a long time in which it is allowed to react with the substances in the water and, for another thing, the fine distribution of the gas bubbles in the liquid produces a large reaction surface. These factors contribute to a markedly improved effectiveness of the method according to the invention as compared with known methods.

The method according to the invention allows a dispersion with minimum-sized bubbles in the angstrom to nanometer ranges to be produced, accompanied by a distinct increase in the chemical dissolution of the gas in the liquid.

The invention claimed is:

1. A method of treating a liquid, comprising the following steps:

introducing the liquid to be treated into a space;

allowing a rotating mechanical cavitation element to act upon the liquid as gas is supplied into the region of the surface of the cavitation element and introducing the gas into the liquid by moving the cavitation element; and introducing sound waves directly into the liquid by at least one acoustic power transducer.

2. The method according to claim 1, wherein the space is completely filled with liquid upon introducing the liquid.

3. The method according to claim 1, wherein the acoustic power transducer is a piezoelectric element.

4. The method according to claim 1, wherein the acoustic power transducer gives off sound waves of different frequencies.

5. The method according to claim 4, wherein the frequency of the sound waves is in the range of between 400 and 1500 kHz.

6. The method according to claim 5, wherein the frequency of the sound waves is in the range of between 600 and 1200 kHz.

7. The method according to claim 1, wherein the acoustic power transducer is operated in a pulsed fashion.

8. The method according to claim 1, wherein the supplying of gas is effected in the region of the highest flow velocity at the surface of the cavitation element.

9. The method according to claim 1, wherein the liquid flows through the space.

10. The method according to claim 1, wherein the cavitation element is arranged upstream of the acoustic power transducer.

11. The method according to claim 1, wherein the liquid is degassed prior to the treatment with the cavitation element and the sound waves.

12. The method according to claim 1, wherein at least one acoustic power transducer is arranged upstream of the cavitation element.

13. The method according to claim 12, wherein there is provided a time interval for the liquid between passing the cavitation element and passing the acoustic power transducer, the time interval amounting to a maximum of 10 seconds.

14. The method according to claim 1, wherein said introducing a gas includes converting the gas to a liquid form and feeding the liquid form of the gas into the system.

15. The method according to claim 1, wherein it is employed for the treatment of one of water, drinking water or wastewater.

16. The method according to claim 15, wherein the gas contains at least one gas having oxidative properties.

17. The method according to claim 16, wherein the gas is treated with UV light before being supplied.

18. The method according to claim 1, wherein it is employed for degerminating the liquid or for destroying bacteria, viruses, proteins, fungal spores, toxins, or endocrine disrupting substances.

19. A method of treating a liquid, comprising the following steps:

introducing the liquid to be treated into a space:

allowing a mechanical cavitation element to act upon the liquid as gas is supplied into the region of the surface of the cavitation element and introducing the gas into the liquid by moving the cavitation element; and introducing sound waves directly into the liquid by at least one acoustic power transducer, thereby obtaining a sonochemical dissolution of the gas in the liquid with a predominant proportion of the gas being present in a molecularly dispersively dissolved form.

20. The method according to claim 19, wherein a bubble size is less than 50 micrometers.

21. The method according to claim 20, wherein a mean bubble size lies in a nanometer range and a large proportion of bubbles is generated in an Angstrom range.

22. A method of treating a liquid, comprising the following steps:

introducing the liquid to be treated into a space;

allowing a rotating discus-shaped mechanical cavitation element to act upon the liquid as gas is supplied into the region of the surface of the cavitation element and introducing the gas into the liquid by moving the cavitation element; and introducing sound waves directly into the liquid by at least one acoustic power transducer.

23. The method according to claim 22, wherein the discus-shaped cavitation element is provided with structures in a front face or in a rear face in a region where very high flow velocities develop and the supplying of gas to the rotating cavitation element is effected in the region of the structures.

24. The method according to claim 22, wherein the discus-shaped cavitation element has opposite convex sides that meet at a sharp peripheral edge and has two ellipsoidal pockets in a front face.

* * * * *